US007743152B2

(12) United States Patent
Kottilingal et al.

(10) Patent No.: US 7,743,152 B2
(45) Date of Patent: Jun. 22, 2010

(54) METHOD AND APPARATUS FOR DETECTING THE PRESENCE OF A TERMINAL IN A DATA SESSION

(75) Inventors: Sudeep Ravi Kottilingal, San Diego, CA (US); Fan Ling, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 790 days.

(21) Appl. No.: 11/286,249

(22) Filed: Nov. 22, 2005

(65) Prior Publication Data
US 2007/0097995 A1 May 3, 2007

Related U.S. Application Data (60) Provisional application No. 60/732,419, filed on Oct. 31, 2005.

(51) Int. Cl.
*G06F 15/16* (2006.01)
(52) U.S. Cl. .................. 709/227; 709/237; 370/389
(58) Field of Classification Search ........... 370/389, 370/392, 395.5, 395.52, 395.54, 310.2, 328, 370/338; 709/224, 220, 227, 228, 230, 231, 709/232, 236, 237, 245, 246
See application file for complete search history.

(56) References Cited

U.S. PATENT DOCUMENTS 7,013,346 B1 * 3/2006 Tucker ....................... 709/236

| 7,315,898 | B2 * | 1/2008 | Kohno ................. 709/230 |
| 7,327,676 | B2 * | 2/2008 | Teruhi et al. ............. 370/230 |
| 7,333,439 | B2 * | 2/2008 | Itoh et al. ............. 370/252 |
| 2002/0075844 | A1 | 6/2002 | Hagen |
| 2003/0120789 | A1 | 6/2003 | Hepworth et al. |

(Continued)

FOREIGN PATENT DOCUMENTS

WO WO0217664 2/2002

OTHER PUBLICATIONS

Calvert et al.; "Leveraging Emerging Network Services To Scale Multimedia Applications"; Computer Communications and Networks, 2001; Proceedings; Tenth Annual Conference; Oct. 15-17, 2001; pp. 404-411; XP010562124; Piscataway, NJ, USA.

(Continued)

*Primary Examiner*—Brenda Pham
(74) *Attorney, Agent, or Firm*—Kenyon Jenckes; Kristine U. Ekwueme (57) ABSTRACT

To detect the presence of at least one other terminal in a data session (e.g., an RTP session), terminal a generates a request to solicit a response from each terminal, forms an APP packet in RTCP for the request, encapsulates the APP packet in at least one IP packet, and sends the IP packet(s) to the other terminal(s). Terminal a then monitors for a response from each terminal to which the request is sent. Terminal a declares a terminal to be present in the data session if a response is received from that terminal. Terminal a may send one or more additional requests to each terminal from which a response is not received. Terminal a declares a terminal to be absent from the data session if a predetermined number of (e.g., two) requests have been sent to that terminal and a response is not received from the terminal.

32 Claims, 7 Drawing Sheets

U.S. PATENT DOCUMENTS

| | | | |
|---|---|---|---|
| 2003/0126238 A1* | 7/2003 | Kohno et al. | 709/220 |
| 2004/0158704 A1* | 8/2004 | Oates et al. | 713/151 |
| 2005/0094557 A1* | 5/2005 | Chen et al. | 370/229 |
| 2005/0114496 A1* | 5/2005 | Fang et al. | 709/224 |
| 2005/0207399 A1* | 9/2005 | Spitzer | 370/352 |
| 2006/0034188 A1* | 2/2006 | Oran et al. | 370/254 |
| 2006/0050705 A1* | 3/2006 | Kim | 370/392 |
| 2007/0021133 A1* | 1/2007 | Coulas | 455/518 |

OTHER PUBLICATIONS

Schulzrinne, et al., RTP: A Transport Protocol for Real Time Applications: Standards Track RFC 3550 (Jul. 2003).

* cited by examiner

METHOD AND APPARATUS FOR DETECTING THE PRESENCE OF A TERMINAL IN A DATA SESSION

RELATED APPLICATIONS

This application claims the benefit of provisional U.S. application Ser. No. 60/732,419, entitled "METHOD AND APPARATUS FOR DETECTING THE PRESENCE OF A TERMINAL IN A DATA SESSION," filed Oct. 31, 2005, assigned to the assignee of the present application, and incorporated herein by reference in its entirety for all purposes.

BACKGROUND

1. Field

The present disclosure relates generally to communication, and more specifically to techniques for detecting the presence of a terminal in a data session.

2. Background

Wireless and wireline communication networks are widely deployed to provide various communication services such as voice, video, packet data, messaging, broadcast, multimedia, and so on. Each service may have different characteristics and requirements. For example, a packet data call may be bursty in nature but may be able to tolerate variable and long delay. In contrast, a voice call may generate data at regular intervals and may have a relatively stringent delay requirement.

Multiple terminals may establish a data session via one or more networks to exchange real-time data such as voice, video, and so on. For example, the data session may be for a teleconference call between multiple participants located at different sites. During the data session, each terminal may send data to other terminals if and when there is data to send. The data exchanges between the terminals may be sporadic. Furthermore, the data session may last a long time, and terminals may join and leave the data session at any time during the session. Because of the dynamic nature of the data session, it may be desirable to ascertain whether a given terminal is still present in the data session.

Various schemes are available to ascertain whether a given terminal is present in a data session. In one scheme, each terminal sends idle packets periodically during the data session to notify other terminals of the presence of the sending terminal. This scheme may result in many idle packets being sent, which may be highly undesirable for a wireless network since radio resources are scarce. Furthermore, idle packets may not be defined for all types of media, e.g., images, text, and so on. In another scheme, each terminal periodically generates and sends reports to other terminals. These reports may convey information regarding packets that have been sent and/or packets that have been received by the terminal sending the report. These reports may be sent infrequently (e.g., every 5 seconds) and may be lost due to packet errors. In yet another scheme, a timer is maintained for each terminal in the data session and is refreshed periodically. If the timer for a terminal expires, then that terminal is deemed to have left the data session. The timer is typically set to a large value to reduce the refresh rate, which then takes a long time to detect the absence of a terminal in the data session. Furthermore, network resources are utilized to maintain the timers for the terminals. In general, all of the schemes described above for detecting the presence of terminals in the data session consume network resources and are not very efficient.

There is therefore a need in the art for techniques to efficiently detect the presence of a terminal in a data session.

SUMMARY

Techniques for efficiently detecting the presence of a terminal in a data session are described herein. In an exemplary embodiment, a given terminal a desires to detect the presence of at least one other terminal in a data session, e.g., a Real-time Transport Protocol (RTP) session. This desire may arise, for example, if terminal a has not received data from the other terminal(s) within a predetermined time period or if terminal a suspects that the connection has gone bad. In an embodiment, terminal a generates a request to solicit a response from each of the other terminal(s), forms an APP packet in RTP Control Protocol (RTCP) for the request, encapsulates the APP packet in at least one Internet Protocol (IP) packet, and sends the IP packet(s) to the other terminal(s). Terminal a then monitors for a response from each terminal to which the request is sent. Terminal a declares a terminal to be present in the data session if a response is received from that terminal. Terminal a may send one or more additional requests to each terminal from which a response is not received. Terminal a declares a terminal to be absent from the data session if a predetermined number of (e.g., two) requests have been sent to that terminal and a response is not received from the terminal.

The techniques described herein efficiently detect the presence of a terminal since (1) a request may be sent immediately, if and when knowledge of the presence of that terminal is desired, and (2) the request and response may be sent using a small amount of network resources. Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
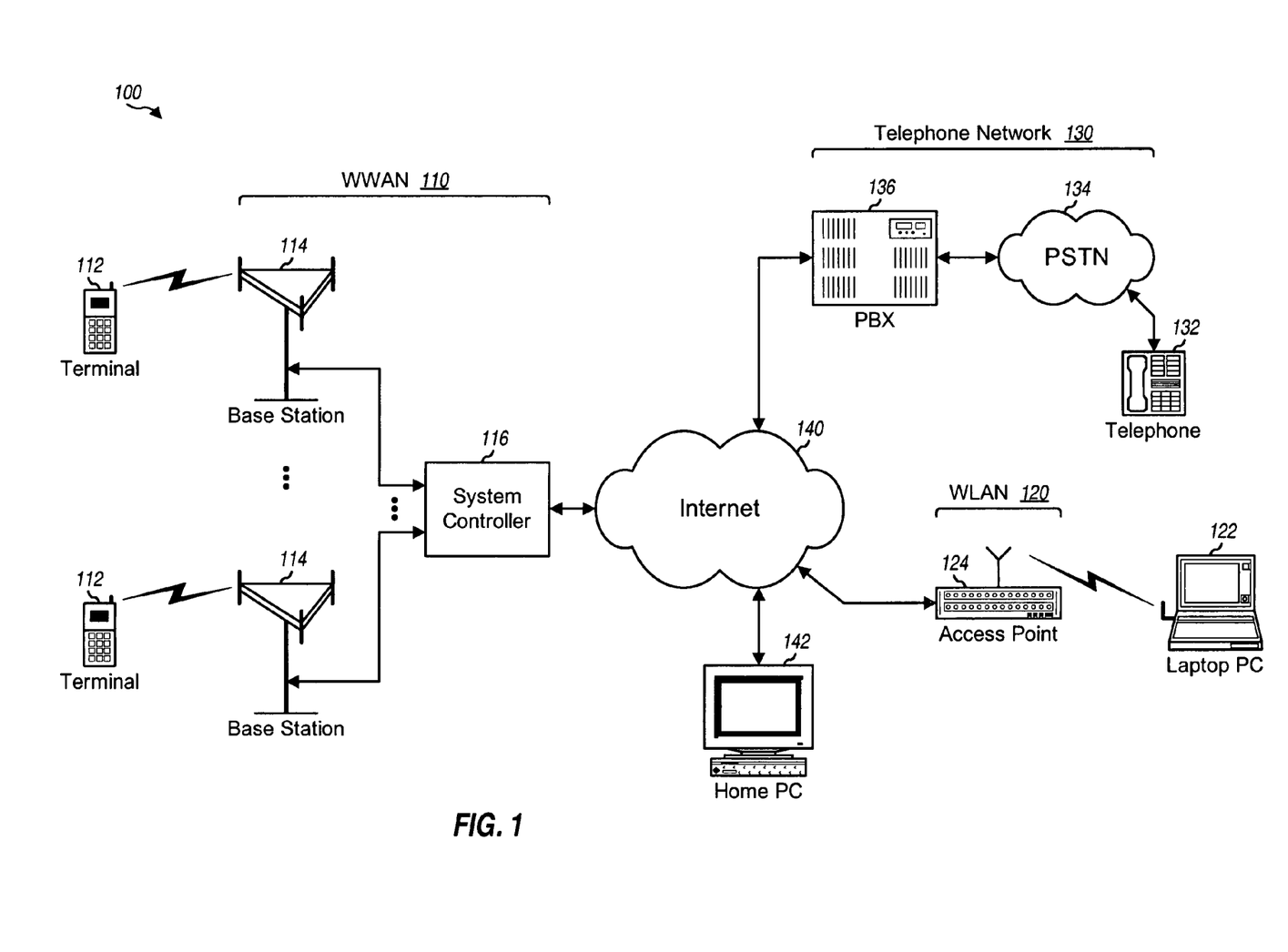
FIG. 1 shows multiple communication networks that interoperate together.

FIG. 1 shows a communication system 100 comprised of multiple communication networks that interoperate together but may otherwise be independent of one another. In FIG. 1, a wireless wide area network (WWAN) 110, a wireless local area network (WLAN) 120, and a telephone network 130 exchange data via Internet 140 and/or some other data network.

WWAN 110 provides communication coverage for a large geographic area and may be a code division multiple access (CDMA) network, a time division multiple access (TDMA) network, a frequency division multiple access (FDMA) network, an orthogonal frequency division multiple access (OFDMA) network, or some other network. A CDMA network may implement one or more radio access technologies (RATs) such as cdma2000, Wideband-CDMA (W-CDMA), and so on. cdma2000 covers IS-2000, IS-95 and IS-856 standards. WWAN 110 may thus be a cdma2000 network that utilizes. IS-2000, IS-95 and IS-856 or a Universal Mobile Telecommunications System (UMTS) network that utilizes W-CDMA. A TDMA network may implement one or more RATs such as Global System for Mobile Communications (GSM), Digital Advanced Mobile Phone System (D-AMPS), and so on. These various RATs and standards are known in the art.

WWAN 110 includes multiple base stations 114, with each base station providing communication coverage for a particular geographic area. A base station is generally a fixed station that communicates with the terminals and may also be called an access point, a Node B, or some other terminology. A system controller 116 couples to base stations 114 and provides coordination and control for these base stations. System controller 116 may be a single network entity or a collection of network entities. For example, system controller 116 may include a packet control function (PCF) and a packet data serving node (PDSN) for a cdma2000 network. System controller 116 may include a serving GPRS support node (SGSN) and a gateway GPRS support node (GGSN) for a UMTS network.

Terminals 112 communicate with base stations 114. A terminal may also be called a mobile station, an access terminal, user equipment, or some other terminology. A terminal may be a wireless device, a cellular phone, a wireless modem, a personal digital assistant (PDA), and so on. A terminal may communicate with zero, one, or multiple base stations 114 on the forward and/or reverse links at any given moment.

WLAN 120 provides communication coverage for a limited geographic area. WLAN 120 may be an IEEE 802.11 network, a Bluetooth network, or some other type of network. WLAN 120 includes one or more access points 124 that communicate with terminals 122 and further exchange packet data with Internet 140. Telephone network 130 includes a public switch telephone network (PSTN) 134 and a private branch exchange (PBX) 136. PSTN 134 supports voice communication for conventional plain old telephone system (POTS). PBX 136 routes inbound voice and data calls to the appropriate destinations and facilitates the exchange of telephony and data between telephone 132 and other entities. Other entities and devices may also exchange data via Internet 140, such as a home personal computer (PC) 142.

Figure 2:
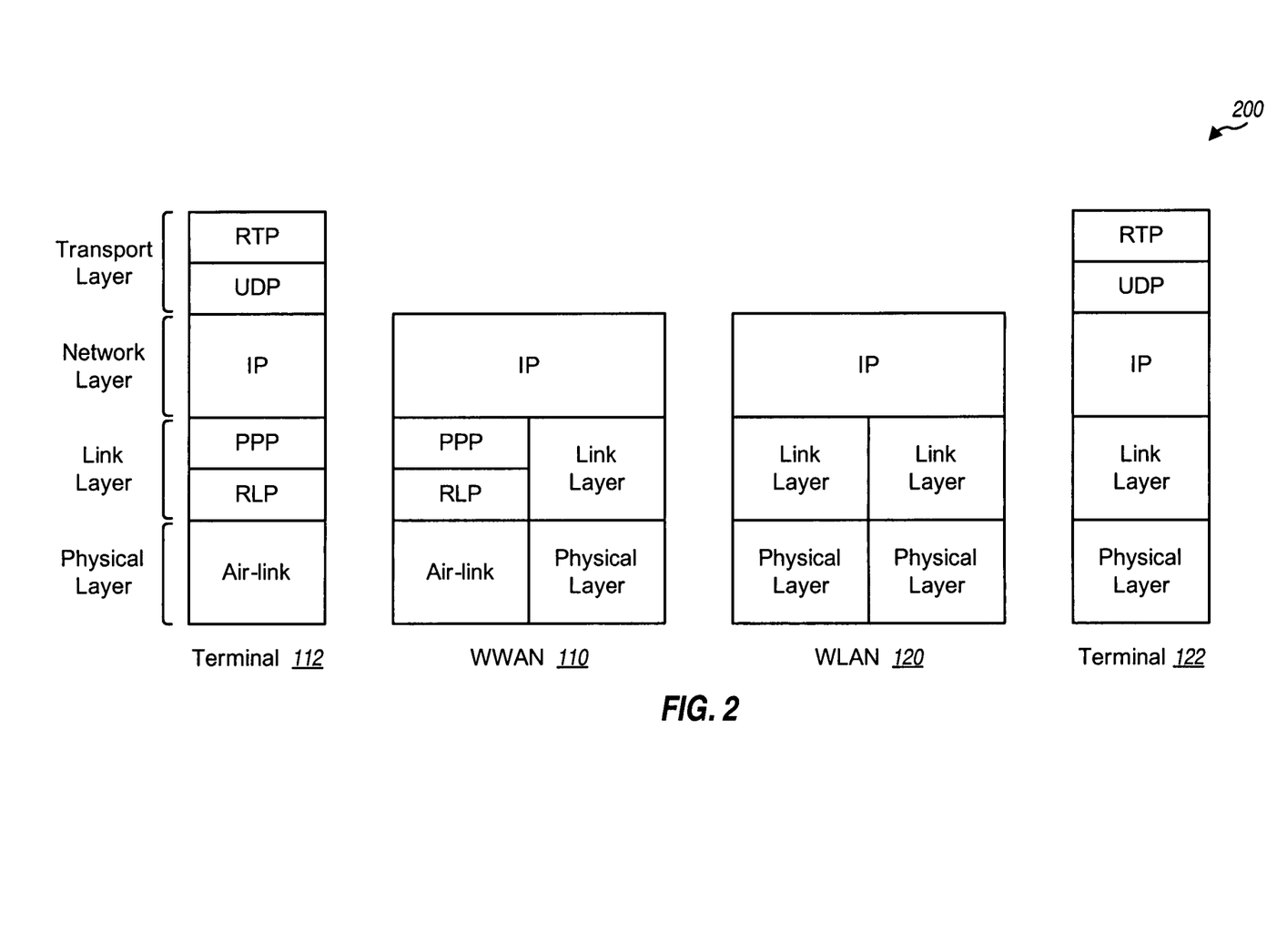
FIG. 2 shows a protocol stack for a data session between two terminals.

FIG. 2 shows an exemplary protocol stack 200 that may be used for a real-time data session between two terminals, e.g., terminal 112 in WWAN 110 and terminal 122 in WLAN 120. Protocol stack 200 includes a transport layer, a network layer, a link layer, and a physical layer.

Terminals 112 and 122 may communicate using Real-time Transport Protocol (RTP) that operates with User Datagram Protocol (UDP) or some other protocol at the transport layer. UDP typically operates on top of Internet Protocol (IP) at the network layer. Terminals 112 and 122 may encapsulate transport layer data (e.g., for UDP) in IP packets and may exchange these IP packets via WWAN 110, Internet 140, and WLAN 120.

The link layer and physical layer between terminal 112 and WWAN 110 are typically dependent on the wireless technology. For a cdma2000 network, the link layer is implemented with Point-to-Point Protocol (PPP) over Radio Link Protocol (RLP). RLP operates on top of an air-link interface, e.g., IS-2000, IS-95 or IS-856. The link layer and physical layer between terminal 122 and WLAN 120 are also dependent on the wireless technology, e.g., IEEE 802.11 or Bluetooth. WWAN 110 and WLAN 120 exchange IP packets via a link layer and a physical layer.

Protocol stack 200 or some other protocol stack may be used for communication between two or more terminals in FIG. 1.

A data session may be established for any number of terminals and any combination of terminals 112, 122, 132 and 142 in FIG. 1. The data session may be for a real-time service such as voice over IP (VoIP), teleconferencing, videoconferencing, and so on. The terminals may exchange real-time data such as voice, video, and so on during the data session.

In general, a data session may utilize various protocols in various layers to send data and signaling. In an embodiment that is described in detail below, the data session utilizes RTP and RTCP. RTP provides end-to-end network transport functions and is suitable for applications transmitting real-time data. RTCP allows for monitoring of the data delivery with RTP. In essence, data may be sent using RTP, and signaling may be sent using RTCP. RTP and RTCP are described in RFC 3550, entitled "RTP: A Transport Protocol for Real-Time Applications," July 2003, which is publicly available. RTP and RTCP typically operate in conjunction with UDP, which typically operates on top of IP, as shown in FIG. 2.

Terminals may join and leave a data session at any time. In certain instances, a given terminal may desire to know whether another terminal is present in the data session. This may be achieved using the schemes described above. However, these schemes consume more network resources than necessary to achieve this detection function and hence waste network resources.

Techniques to efficiently determine whether a given terminal is present in a data session are described herein. The techniques may be used for a unicast data session with two terminals as well as a multicast data session with more than two terminals. The techniques may be used for various layers, such as the link layer, the network layer, the transport layer, and so on. For clarity, the techniques are described below for a data session with RTP/RTCP.

Figure 3:
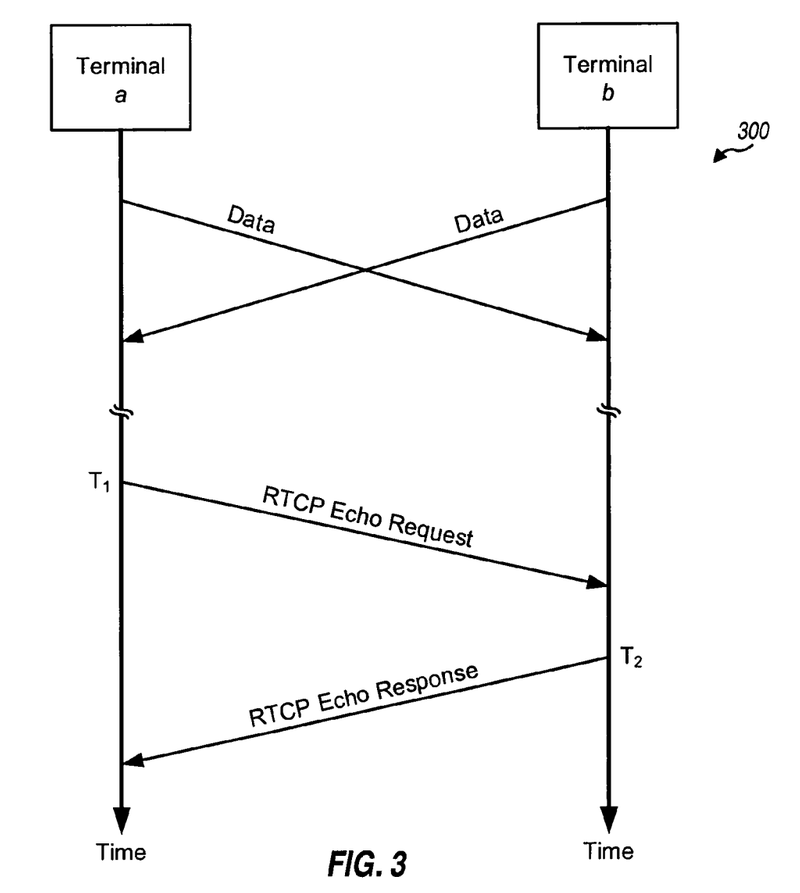
FIG. 3 shows a process to ascertain the presence of a terminal in a unicast data session with two terminals.

FIG. 3 shows an embodiment of a process 300 to ascertain the presence of a terminal in a unicast data session with two terminals a and b. During the data session, terminals a and b may exchange data as the data becomes available. At time $T_1$, terminal a desires to know whether terminal b is still present in the data session. Terminal a may then send an RTCP echo request to terminal b immediately at time $T_1$ (as shown in FIG. 3) or as soon as resources are available. The RTCP echo request, which is also called a ping request, solicits a response from the recipient terminal. Terminal b receives the RTCP echo request and responds by sending an RTCP echo response, which is also called a ping response, back to terminal a at time $T_2$. Terminal a receives the RTCP echo response and recognizes that terminal b is still present in the data session.

Although not shown in FIG. 3, terminal a might not receive an RTCP echo response from terminal b for the RTCP echo request sent at time $T_1$. This may be due to various reasons such as the RTCP echo request not reaching terminal b due to a bad connection, terminal b not being present, the RTCP echo response not reaching terminal a due to a bad connection, and so on. If terminal a does not receive an RTCP echo response within a predetermined time period, then terminal a may send another RTCP echo request to terminal b. In general, terminal a may send any number of RTCP echo requests to terminal b and may wait any amount of time between sending RTCP echo requests. If terminal a does not receive an RTCP echo response from terminal b after sending a predetermined number of (e.g., two) RTCP echo requests, then terminal a may assume that terminal b is not present in the data session and may perform appropriate corrective actions.

Terminal a may use process 300 to ascertain the presence of terminal b, as described above. Terminal a may also use process 300 to check the condition of its connection. For example, terminal a may not have received any packets for a predetermined time period, e.g., 200 milliseconds (ms), 500 ms, or 1 second. As another example, terminal a may not have received acknowledgments for packets sent to other terminals. The absence of activity and/or acknowledgments may result from the connection for terminal a going bad without knowledge of terminal a. In general, terminal a may use various criteria to determine whether its connection has gone bad. Terminal a may then check the connection by sending an RTCP echo request to another terminal. Terminal a may declare the connection to be good if an RTCP echo response is received from another terminal. Alternatively, terminal a may declare the connection to be bad if a predetermined number of RTCP echo requests has been sent and no RTCP echo response is received.

Figure 4:
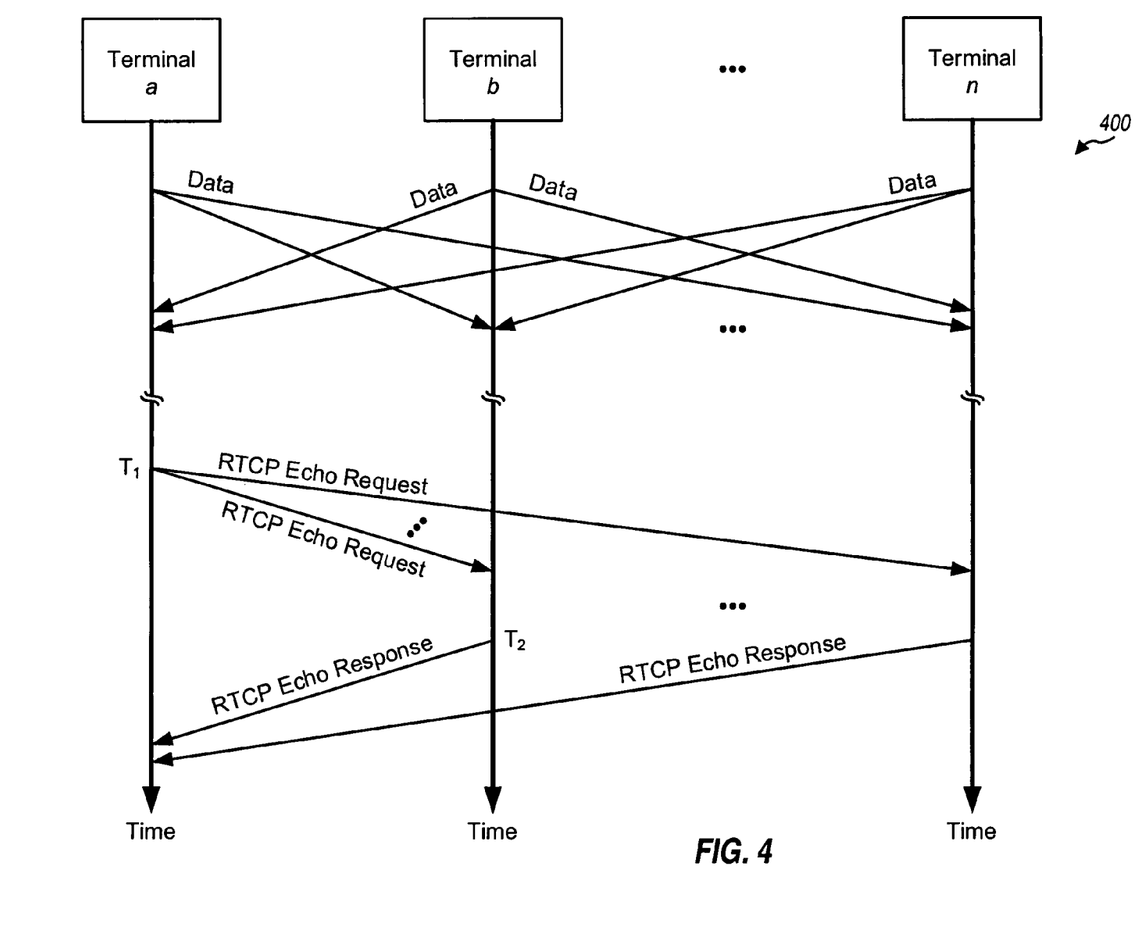
FIG. 4 shows a process to ascertain the presence of a terminal in a multicast data session with N terminals.

FIG. 4 shows an embodiment of a process 400 to ascertain the presence of one or more terminals in a multicast data session with N terminals a through n, where N>2. During the data session, terminals a through n may exchange data as the data becomes available. At time $T_1$, terminal a desires to know whether terminals b through n are still present in the data session. Terminal a may then send an RTCP echo request to terminals b through n immediately at time $T_1$ (as shown in FIG. 4) or as soon as resources are available. A single RTCP echo request may be sent to one, multiple, or all terminals in the data session by setting appropriate fields and/or including the proper destination address(es) in the RTCP echo request, as described below.

Terminal b receives the RTCP echo request and responds by sending an RTCP echo response back to terminal a at time $T_2$. Each of terminals c through n may also receive the RTCP echo request and may respond by sending an RTCP echo response back to terminal a. In general, terminal a may receive RTCP echo responses from all, some, or none of terminals b through n. Terminal a declares the source terminal of each RTCP echo response received by terminal a as being present in the data session.

Although not shown in FIG. 4, terminal a might not receive an RTCP echo response from one or more terminals for the RTCP echo request sent at time $T_1$. Terminal a may then send another RTCP echo request to each terminal that did not respond. In general, terminal a may send any number of RTCP echo requests to the other terminals. Terminal a may assume a terminal to be absent from the data session if an RTCP echo response is not received from that terminal after sending a predetermined number of (e.g., two) RTCP echo requests to the terminal.

For the embodiments shown in FIGS. 3 and 4, any terminal may detect the presence of its peer terminals by sending a simple RTCP echo request. A small amount of network resources is consumed by sending RTCP echo requests and RTCP echo responses. Furthermore, any terminal may detect the presence of the peer terminals at any time during the data session, if and when this information is desired. A terminal may send an RTCP echo request immediately, or when network resources are available, without having to wait for any timer to expire.

An RTCP echo request and an RTCP echo response may be sent using various types of packet. In an embodiment, an RTCP echo request and an RTCP echo response may each be sent using an APP packet, which is an Application-Defined RTCP packet in RTCP. APP packet is intended for proprietary use and may be defined for new applications and new features.

Figure 5:
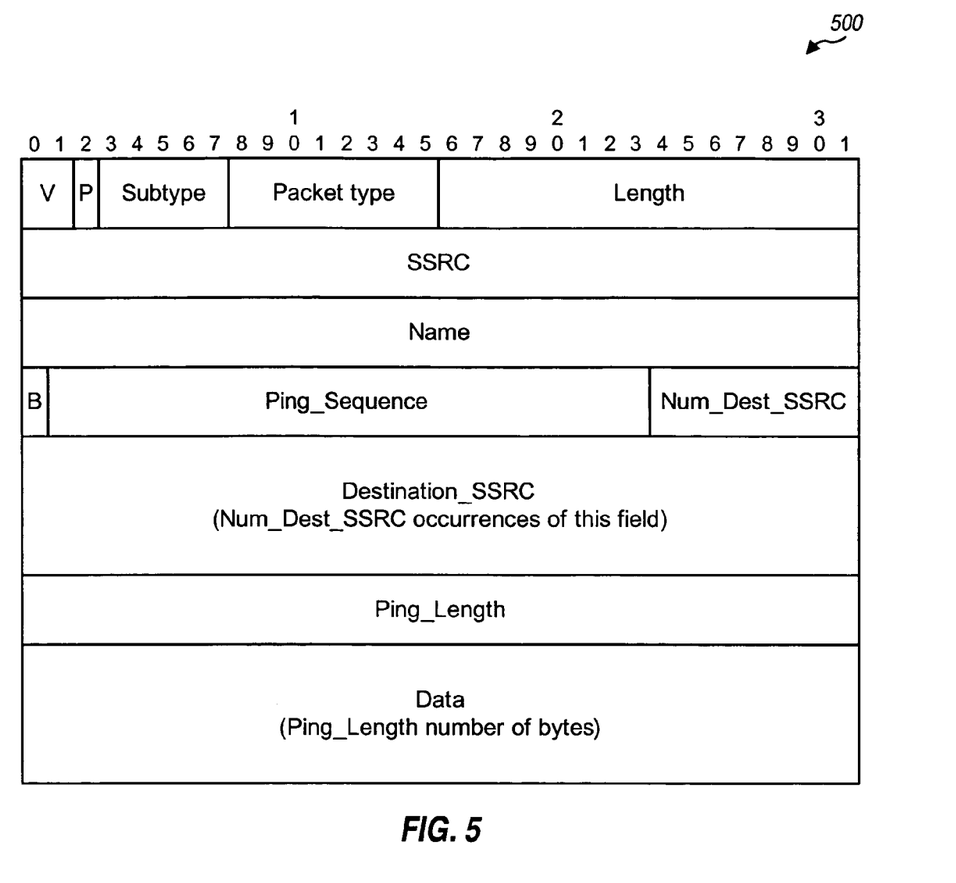
FIG. 5 shows an APP packet for an RTCP echo request.

FIG. 5 shows an embodiment of an APP packet 500 for an RTCP echo request. APP packet 500 may be used to detect the presence of terminals in a data session. Table 1 lists the fields of APP packet 500, the length of each field (in number of bits), and a short description for each field.

TABLE 1

APP packet format for RTCP echo request

| Field | Num bits | Description |
|---|---|---|
| Version (V) | 2 | Set to 2 for RTP and RTCP defined in RFC 3550. |
| Padding (P) | 1 | Indicate whether the packet contains padding. |
| Subtype | 5 | May be used to identify an APP packet as being for an RTP echo request. |
| Packet Type | 8 | Set to 204 for an APP packet. |
| Length | 16 | Indicate the length of the APP packet. |
| SSRC | 32 | Contain a synchronization source (SSRC) identifier for the sender of the APP packet. |
| Name | 32 | Contain a unique name (e.g., "RTP echo request") for the APP packet. |
| Broadcast (B) | 1 | Set to true ('1') if the APP packet is being sent to all terminals in an RTP session. |
| Ping_Sequence | 23 | Contain a sequence number for the RTCP echo request. |
| Num_Dest_SSRC | 8 | Indicate the number of destination SSRC identifiers included in the APP packet. |
| Destination_SSRC | Variable | Contain an SSRC identifier for each terminal requested to send an RTCP echo response. |
| Ping_Length | 32 | The length of the subsequent Data field. |
| Data | Variable | Contain the data for the RTCP echo request. |

A data session may be a multimedia session that is composed of one or more RTP sessions. For example, a multimedia session such as a videoconference may be composed of an audio RTP session and a video RTP session. Each RTP session is an association among a group of terminals communicating with RTP. Each RTP session maintains a separate set of synchronization source (SSRC) identifiers for the terminals participating in that RTP session. Each terminal in a given RTP session is identified by an SSRC identifier that is unique among all terminals in that RTP session. The individual terminals in each RTP session may be uniquely identified by their SSRC identifiers. A given terminal may participate in multiple RTP sessions at the same time.

An APP packet for an RTCP echo request may be sent to all terminals in a given RTP session by setting the Broadcast (B) field to true ('1'). In this case, the Num_Dest_SSRC field may be set to zero, and the Destination_SSRC field may be omitted. An APP packet for an RTCP echo request may also be sent to one or more specific terminals in a given RTP session by setting the broadcast (B) field to false ('0'), setting the Num_Dest_SSRC field to the number of terminals to which the RTCP echo request is sent, and including the SSRC identifier for each recipient terminal in an instance of the Destination_SSRC field. The Ping_Sequence is set to a new value (e.g., by incrementing the last value) each time a new RTCP echo request is sent. The Ping_Sequence value is used to associate the RTCP echo request with the corresponding RTCP echo responses. The Data field may carry any data, e.g., data used to check the condition of the connection.

APP packet 500 may also be used for an RTCP echo response. However, a different unique name may be defined for the Name field and/or a different value may be used for the Subtype field of an APP packet for an RTCP echo response. An APP packet for an RTCP echo response may be sent to the terminal that sent the RTCP echo request (or requesting terminal) by setting the Broadcast field to false and including the SSRC identifier of the requesting terminal in the Destination_SSRC field. An APP packet for an RTCP echo response may also be sent to (1) all terminals in the data session by setting the Broadcast field to true or (2) one or more other specific terminals by including the SSRC identifier for each terminal in the Destination_SSRC field.

A specific design of an APP packet suitable for both RTCP echo request and RTCP echo response has been described above. Various other designs may also be used for the APP packets for RTCP echo request and RTCP echo response. The RTCP echo request and RTCP echo response may also be sent in other types of packets besides APP packet.

A data session may include multiple RTP sessions. In an embodiment, terminal a sends an RTCP echo request to another terminal b for each RTP session in which both terminals are participants. For this embodiment, terminal a can ascertain whether terminal b is present in each RTP session. In another embodiment, terminal a sends an RTCP echo request to terminal b for one RTP session. For this embodiment, terminal a can ascertain the presence of terminal b in the RTP session for which the RTCP echo request was sent and may then presume terminal b to be similarly present or absent in all other RTP sessions.

Figure 6:
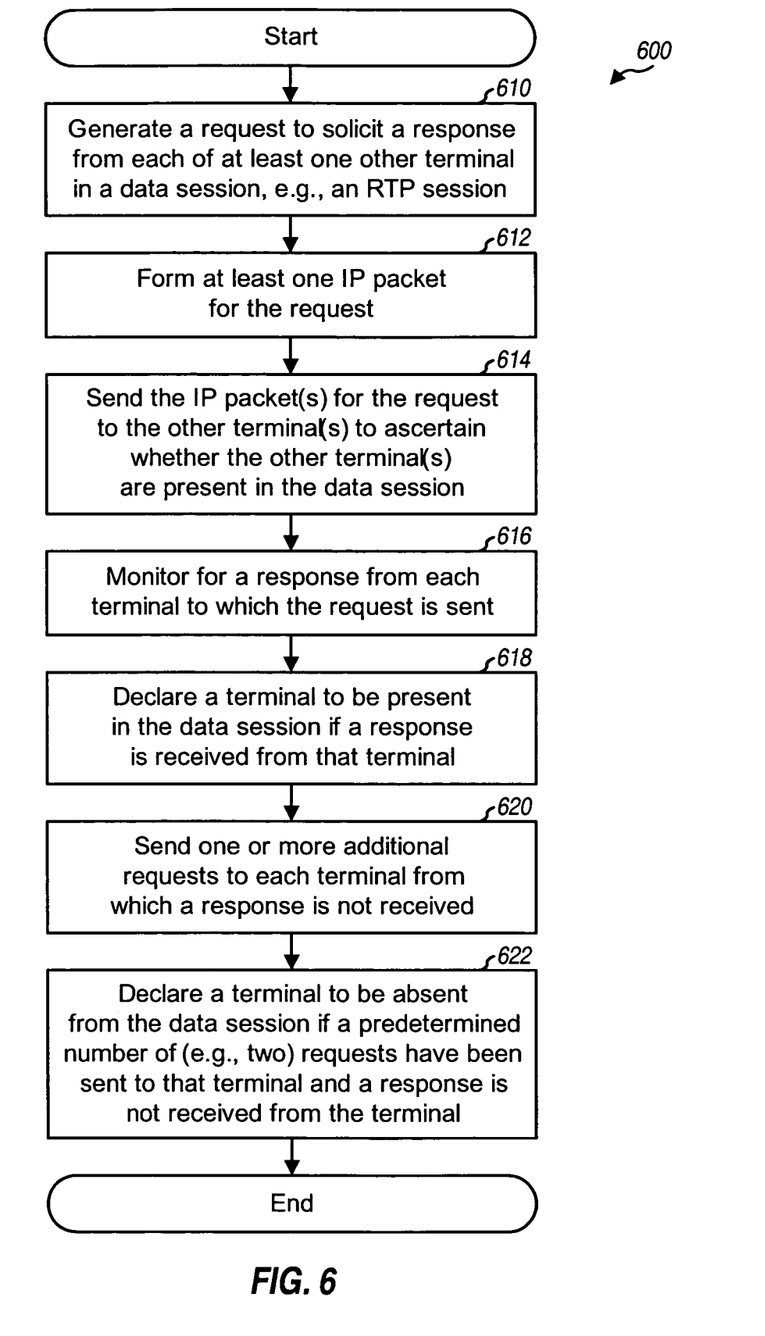
FIG. 6 shows a process performed by a terminal to determine the presence of other terminals in a data session.

FIG. 6 shows a process 600 performed by a given terminal a to determine the presence of other terminals in a data session. Terminal a desires to detect the presence of at least one other terminal in a data session (e.g., an RTP session) and generates a request to solicit a response from each terminal (block 610). This desire may arise, for example, if terminal a has not received data from other terminal(s) within a predetermined time period, if terminal a suspects that its connection has gone bad, and so on. Terminal a forms at least one IP packet for the request (block 612). For block 612, terminal a may form an APP packet for the request and may send the APP packet (1) to all terminals in the data session by setting the broadcast field in the APP packet to true or (2) to specific terminal(s) in the data session by including the SSRC identifier for each terminal in the APP packet. Terminal a may then encapsulate the APP packet in at least one IP packet.

Terminal a sends the IP packet(s) for the request to the other terminal(s) to ascertain whether the other terminal(s) are present in the data session (block 614). Terminal a then monitors for a response from each terminal to which the request is sent (block 616). Terminal a declares a terminal to be present in the data session if a response is received from that terminal (block 618). Terminal a may send one or more additional requests to each terminal from which a response is not received (block 620). Terminal a may declare a terminal to be absent from the data session if a predetermined number of (e.g., two) requests have been sent to that terminal and a response is not received from the terminal (block 622).

Figure 7:
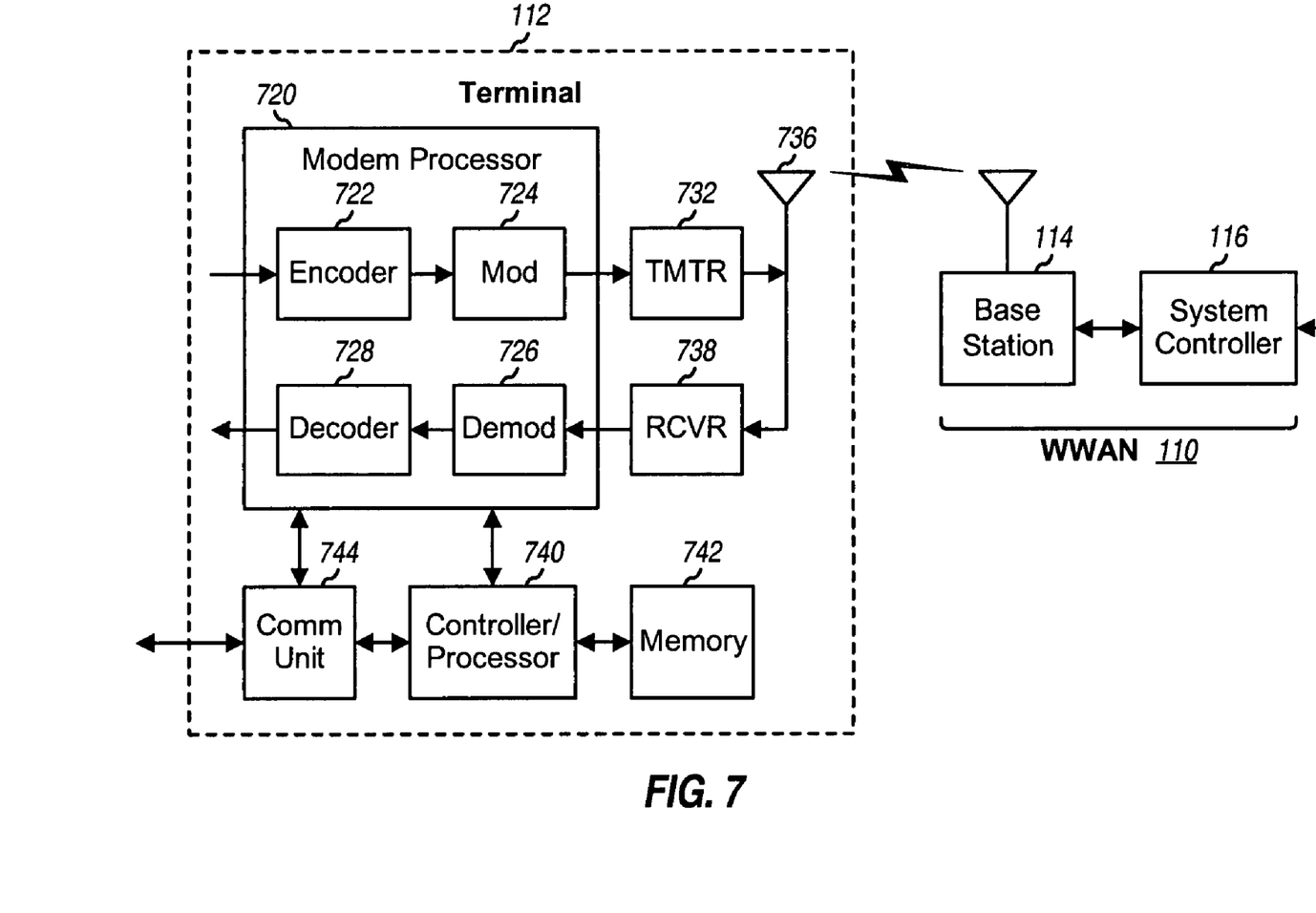
FIG. 7 shows a block diagram of a terminal.

FIG. 7 shows a block diagram of an embodiment of terminal 112 in FIG. 1. Terminal 112 includes a wireless modem for communication with WWAN 110. On the transmit path of the wireless modem, data and signaling (e.g., for an echo request or an echo response) to be sent by terminal 112 are processed (e.g., formatted, encoded, and interleaved) by an encoder 722 and further processed (e.g., modulated, channelized, and spectrally spread) by a modulator (Mod) 724 to obtain data chips. A transmitter (TMTR) 732 then conditions (e.g., converts to analog, filters, amplifies, and frequency upconverts) the data chips to generate an uplink signal, which is transmitted via an antenna 736. On the receive path, downlink signals transmitted by base stations in WWAN 110 are received by antenna 736 and provided to a receiver (RCVR) 738. Receiver 738 conditions (e.g., filters, amplifies, frequency downconverts, and digitizes) the received signal and provides data samples. A demodulator (Demod) 726 processes (e.g., despreads, channelizes, and demodulates) the samples to obtain symbol estimates. A decoder 728 further processes (e.g., deinterleaves and decodes) the symbol estimates to obtain decoded data. Encoder 722, modulator 724, demodulator 726, and decoder 728 may be implemented by a modem processor 720. These units perform processing in accordance with the wireless technology (e.g., cdma2000 or W-CDMA) used by WWAN 110.

A controller/processor 740 directs the operation of various units within terminal 112. Controller/processor 740 may implement process 300, 400 and/or 600 shown in FIGS. 3, 4 and/or 6, respectively. A memory 742 stores program codes and data for terminal 112. A communication (Comm) unit 744 provides an interface for communication with an external device and/or a wireline network.

The techniques described herein may be advantageously used to detect for the liveliness of individual terminals in a packet-switched session. For the packet-switched session, no dedicated connections are set up between the terminals in the session, packets are routed as appropriate, and there is no easy way to detect when a circuit for a terminal is broken. In contrast, for a circuit-switched session, a dedicated connection is set up between the terminals in the session, and each terminal may be able to detect when the connection is broken. The techniques described herein allow for detection of the presence of terminals that do not have dedicated connections.

The techniques described herein allow for detection of terminals without using keep-alive mechanisms such as idle packets, timers, and so on. These techniques are particularly advantageous for a wireless network since few packets are sent for echo requests and echo responses, if and when desired. The techniques also avoid the use of timers, which conserves network resources needed to maintain the timers.

The techniques described herein may be implemented by various means. For example, these techniques may be implemented in hardware, firmware, software, or a combination thereof. For a hardware implementation, the processing units used to send echo requests and echo responses may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The software codes may be stored in a memory (e.g., memory 742 in FIG. 7) and executed by a processor (e.g., processor 740). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus, comprising:
   at least one processor configured to send a Real-time Transport Control Protocol (RTCP) echo request to at least one terminal to ascertain whether the at least one terminal is present in a data session, and to monitor for a RTCP echo response from each of the at least one terminal;
   a memory coupled to the at least one processor; and
   wherein the RTCP echo request further comprises an Application-Defined RTCP packet in RTCP (APP packet) having a predetermined subtype value in a subtype field, wherein the predetermined subtype value identifies the APP packet as being for a Real-time Transport Protocol (RTP) echo request that solicits a response from a recipient.

2. The apparatus of claim 1, wherein for each of the at least one terminal the at least one processor is configured to declare the terminal to be present in the data session if a response is received from the terminal.

3. The apparatus of claim 1, wherein the at least one processor is configured to send at least one additional inquest to each terminal from which a response is not received.

4. The apparatus of claim 1, wherein for each of the at least one terminal the at least one processor is configured to declare the terminal to be absent from the data session if a predetermined number of requests have been sent to the terminal and a response is not received from the terminal.

5. The apparatus of claim 1, wherein the at least one processor is configured to send data using User Datagram Protocol (UDP) over IP.

6. The apparatus of claim 1, wherein the at least one processor is configured to send data using Real-time Transport Protocol (RTP).

7. The apparatus of claim 6, wherein the at least one processor is configured to encapsulate the APP packet in at least one IP packet.

8. The apparatus of claim 7, wherein the at least one processor is configured to send the APP packet to all terminals in the data session.

9. The apparatus of claim 7, wherein the at least one processor is configured to send the APP packet specifically to the at least one terminal by including at least one synchronization source (SSRC) identifier for the at least one terminal in the APP packet.

10. The apparatus of claim 1, wherein the at least one processor is configured to send the request to the at least one terminal if no data is received from the at least one terminal in a predetermined time period.

11. The apparatus of claim 1, wherein the at least one processor is configured to send the request to the at least one terminal if a bad connection is suspected.

12. The apparatus of claim 1, further comprising:
   a transmitter configured to send the at least one RTCP echo request to a wireless communication network.

13. A method, comprising:
   sending by a first terminal a Real-time Transport Control Protocol (RTCP) echo request to at least one second terminal to ascertain whether the at least one second terminal is present in a data session;
   monitoring for a RTCP echo response from each of the at least one second terminal; and
   wherein sending the RTCP echo request further comprises generating an Application-Defined RTCP packet in RTCP (APP racket) having a predetermined subtype value in a subtype field, wherein the predetermined subtype value identifies the APP packet as being for a Real-time Transport Protocol (RTP) echo request that solicits a response from a recipient.

14. The method of claim 13, further comprising:
   declaring by the first terminal each of the at least one second terminal to ho present in the data session if a response is received from the terminal.

15. The method of claim 13, further comprising:
   declaring by the first terminal each of the at least one second terminal to be absent from the data session if a predetermined number of requests have been sent to the terminal and a response is not received from the terminal.

16. The method of claim 13, further comprising:
   sending by the first terminal data using Real-time Transport Protocol (RTP).

17. An apparatus, comprising:
   means for sending a Real-time Transport Control Protocol (RTCP) echo request to at least one terminal to ascertain whether the at least one terminal is present in a data session;
   means for monitoring for a RTCP echo response from each of the at least one terminal; and
   wherein means for sending the RTCP echo request further comprises means for generating an Application-Defined RTCP packet in RTCP (APP packet) having predetermined subtype value in a subtype field, wherein the predetermined subtype value identifies the APP packet as being for a Real-time Transport Protocol (RTP) echo request that solicits a response from a recipient.

18. The apparatus of claim 17, further comprising:
   means for declaring each of the at least one terminal to be present in the data session if a response is received from the terminal.

19. The apparatus of claim 17, further comprising:
   means for declaring each of the at least one terminal to be absent from the data session it a predetermined number of requests have been sent to the terminal and a response is not received from the terminal.

20. The apparatus of claim 17, further comprising:
   means for sending data using Real-time Transport Protocol (RTP).

21. A processor readable storage medium having stored thereon processor executable instructions, when executed by the processor operable to:
   send a Real-time Transport Control Protocol (RTCP) echo request to at least one terminal to ascertain whether the at least one terminal is present in a data session;
   monitor for a RTCP echo response from each of the at least one terminal; and
   wherein the RTCP echo request further comprises an Application-Defined RTCP packet in RTCP (APP packet) having a predetermined subtype value in a subtype field, wherein the predetermined subtype value identifies the APP packet as being fix a Real-time Transport Protocol (RTP) echo request that solicits a response from a recipient.

22. The processor readable storage medium of claim 21, and further for storing instructions operable to:
declare each of the at least one terminal to be preset in the data session if a response is received from the terminal.

23. The processor readable storage medium of claim 21, and further for storing instructions operable to:
declare each of the at least one terminal to be absent from the data session if a predetermined number of requests have been sent to the terminal and a response is not received from the terminal.

24. The processor readable storage medium of claim 21, and further for storing instructions operable to:
send data using Real-time Transport Protocol (RTP).

25. An apparatus comprising:
at least one processor configured
to receive, at a first terminal, a Real-time Transport Control Protocol (RTCP) echo request from a second terminal soliciting a RTCP echo response from the first terminal to ascertain whether the first terminal is present in a data session, wherein the RTCP echo request further comprises a first Application Defined RTCP packet in RTCP (APP packet) having a first predetermined subtype value in a subtype field, wherein the first predetermined subtype value identifies the first APP packet as being for a Real-time Transport Protocol (RTP) echo request that solicits a response from a recipient; and
to send the RTCP echo response to the second terminal, wherein the RTCP echo response further comprises a second APP packet having a second predetermined subtype value in the subtype field, wherein the second predetermined subtype value identifies the APP packet as being for an RTP echo response; and
a memory coupled to the at least one processor.

26. The apparatus of claim 25, wherein the at least one processor is configured to send data using User Datagram Protocol (UDP) over IP.

27. The apparatus of claim 25, wherein the at least one processor is configured to send data using Real-time Transport Protocol (RTP).

28. The apparatus of claim 1, wherein the APP packet further comprises a broadcast field to indicate whether or not the APP packet is to be broadcast and a destination identifier field to identify destination devices for the APP packet, and wherein the at least one processor is further configured to broadcast the RTCP echo request to one or more terminals associated with the data session by setting the broadcast field to a predetermined broadcast value indicating to broadcast the APP packet, and omitting a value from the destination identifier field.

29. The method of claim 13, wherein sending the RTCP echo request further comprises broadcasting by the first terminal to one or more second terminals associated with the data session, wherein the APP packet further comprises a broadcast field to indicate whether or not the APP packet is to be broadcast and a destination identifier field to identify destination devices for the APP packet, and further comprising setting the broadcast field to a predetermined broadcast value indicating to broadcast the APP packet, and omitting a value front the destination identifier field.

30. The apparatus of claim 17, wherein the means for sending further comprises means for broadcasting the RTCP echo request to one or more terminals associated with the data session, wherein the APP packet further comprises a broadcast field to indicate whether or not the APP packet is to be broadcast and a destination identifier field to identify destination devices for the APP packet, and wherein the means for broadcasting further comprises means for setting the broadcast field to a predetermined broadcast value indicating to broadcast the APP packet and means for omitting a value from the destination identifier field.

31. The processor readable storage medium of claim 21, wherein the APP packet further comprises a broadcast field to indicate whether or not the APP packet is to be broadcast and a destination identifier field to identify destination devices for the APP packet, and wherein the processor executable instructions, when executed by the processor, are further operable to broadcast the RTCP echo request to one or more terminals associated with the data session by setting the broadcast field to a predetermined broadcast value indicating to broadcast the APP packet and by omitting a value from the destination identifier field.

32. The apparatus of claim 25, wherein the first APP packet further comprises a broadcast field to indicate whether or not the first APP packet is to be broadcast and a destination identifier field to identify destination devices for the first APP packet, and wherein the broadcast field comprises a predetermined broadcast value indicating to broadcast the APP packet and a value is omitted from the destination identifier field.

* * * * *